United States Patent
Li (10) Patent No.: US 12,010,450 B2
(45) Date of Patent: *Jun. 11, 2024

(54) ON-SCREEN DISPLAY (OSD) IMAGE PROCESSING METHOD

(71) Applicant: NOVATEK MICROELECTRONICS CORP., Hsinchu (TW)

(72) Inventor: Ya-Lun Li, Zhubei (TW)

(73) Assignee: Novatek Microelectronics Corp., Hsinchu (TW)

(*) Notice: Subject to any disclaimer, the term of this patent is extended or adjusted under 35 U.S.C. 154(b) by 230 days.

This patent is subject to a terminal disclaimer.

(21) Appl. No.: 17/812,011

(22) Filed: Jul. 12, 2022

(65) Prior Publication Data

US 2023/0300283 A1   Sep. 21, 2023

Related U.S. Application Data

(63) Continuation-in-part of application No. 17/655,601, filed on Mar. 21, 2022.

(30) Foreign Application Priority Data

May 23, 2022  (TW) ................... 111119146

(51) Int. Cl.
*H04N 5/14*  (2006.01)
*H04N 7/01*  (2006.01)

(52) U.S. Cl.
CPC ........... *H04N 5/145* (2013.01); *H04N 7/0127* (2013.01); *H04N 7/014* (2013.01)

(58) Field of Classification Search
CPC .. H04N 5/145; H04N 5/44504; H04N 7/0127; H04N 7/013; H04N 7/014
See application file for complete search history.

(56) References Cited

U.S. PATENT DOCUMENTS

| | | | |
|---|---|---|---|
| 6,192,079 B1* | 2/2001 | Sharma | H04N 19/587 375/240.15 |
| 6,295,089 B1* | 9/2001 | Hoang | H04N 19/59 375/240.18 |
| 6,594,313 B1* | 7/2003 | Hazra | H04N 19/587 375/E7.263 |
| 7,102,613 B1* | 9/2006 | Morrish | H04N 5/44504 348/569 |

(Continued)

*Primary Examiner* — Peter D Le
(74) *Attorney, Agent, or Firm* — Rosenberg, Klein & Lee (57) ABSTRACT

In an on-screen display (OSD) image processing method for generating an interpolated frame with interpolated blocks, motion compensation is performed to generate motion compensation (MC) data according to a first motion vector referring to a previous frame and a second motion vector referring to a current frame. Zero-motion data are generated according to a zero-motion vector referring to the previous frame and the current frame. The MC data of a first weight and the zero-motion data of a second weight are blended to generate each interpolated block as a processed block. When the number of pixels having OSD data in the processed block is less than a first positive threshold and larger than a second positive threshold, the processed block is determined as an extended OSD block and the second weight of the extended OSD block is less than that of an OSD block.

11 Claims, 6 Drawing Sheets

(56) References Cited

U.S. PATENT DOCUMENTS

| | | | | |
|---|---|---|---|---|
| 8,233,085 B1* | 7/2012 | Liu | ................... | H04N 7/014 348/452 |
| 2004/0252895 A1* | 12/2004 | Hur | ................... | H04N 19/31 348/E7.013 |
| 2005/0132403 A1* | 6/2005 | Lee | ................... | G06F 3/14 725/38 |
| 2006/0239353 A1* | 10/2006 | De Haan | ................... | H04N 19/593 375/E7.125 |
| 2007/0182681 A1* | 8/2007 | Kim | ................... | G06F 3/147 345/87 |
| 2008/0165851 A1* | 7/2008 | Shi | ................... | H04N 19/139 375/E7.254 |
| 2009/0003450 A1* | 1/2009 | Takahashi | ................... | H04N 7/012 375/E7.076 |
| 2009/0087125 A1* | 4/2009 | Urushihara | ................... | H04N 19/61 382/300 |
| 2009/0122188 A1* | 5/2009 | Hanaoka | ................... | H04N 7/014 348/E7.003 |
| 2009/0148058 A1* | 6/2009 | Dane | ................... | H04N 19/154 382/251 |
| 2009/0207183 A1* | 8/2009 | Matsuura | ................... | H04N 21/440281 345/606 |
| 2009/0295768 A1* | 12/2009 | Shin | ................... | G09G 3/3648 345/204 |
| 2010/0053428 A1* | 3/2010 | Ohe | ................... | H04N 21/431 348/E7.003 |
| 2010/0321566 A1* | 12/2010 | Yamamoto | ................... | H04N 7/0112 348/E7.003 |
| 2010/0328529 A1* | 12/2010 | Hirayama | ................... | H04N 7/0132 348/E7.003 |
| 2010/0328532 A1* | 12/2010 | Wu | ................... | G06V 30/1478 348/E5.062 |
| 2011/0211083 A1* | 9/2011 | Petrides | ................... | H04N 23/683 348/E7.003 |
| 2011/0285902 A1* | 11/2011 | Hoshino | ................... | H04N 7/013 348/E7.003 |
| 2013/0120529 A1* | 5/2013 | Nio | ................... | H04N 19/139 348/43 |
| 2020/0186706 A1* | 6/2020 | Yamasaki | ................... | H04N 23/695 |

\* cited by examiner

ON-SCREEN DISPLAY (OSD) IMAGE PROCESSING METHOD

CROSS-REFERENCE TO RELATED APPLICATION

This application is a Continuation in Part of co-pending application Ser. No. 17/655,601, filed on 21 Mar. 2022, for which priority is claimed under 35 U.S.C. § 120 and the entire contents of all of which are hereby incorporated by reference.

This application claims priority of Application No. 111119146 filed in Taiwan on 23 May 2022 under 35 U.S.C. § 119; the entire contents of all of which are hereby incorporated by reference.

BACKGROUND OF THE INVENTION

Field of the Invention

The invention relates to an image processing method, particularly to an on-screen display (OSD) image processing method.

Description of the Related Art

In inter-frame predictive coding, there is a certain correlation between the scenes in the adjacent frames of the moving image. Therefore, the moving image can be divided into several blocks. The divided blocks may be used to reduce the hardware cost. The position of each block or macro block in the adjacent frames is found to obtain the relative offset between the spatial positions of the two blocks. The relative offset is usually referred to as the motion vector. The process of obtaining the motion vector is called motion estimation.

Figure 1:
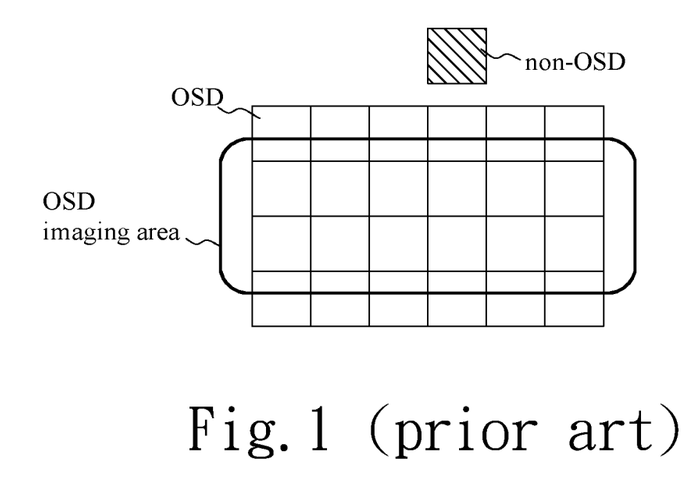
FIG. 1 is a diagram schematically illustrating an OSD imaging area in a conventional technology.
Figure 2:
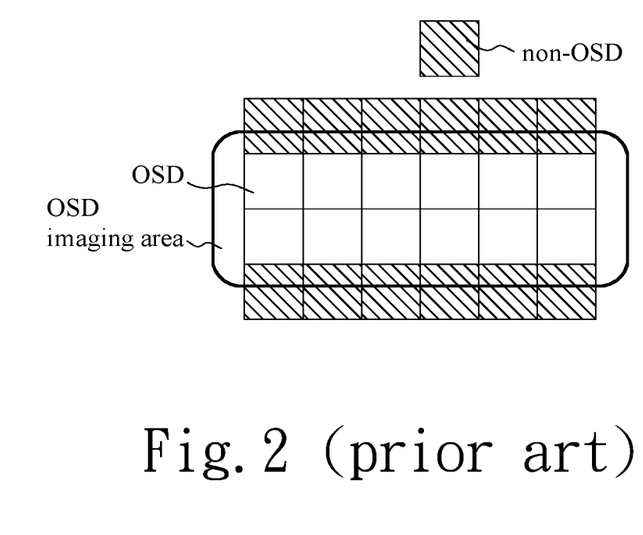
FIG. 2 is a diagram schematically illustrating another OSD imaging area in a conventional technology.

FIG. 1 is a diagram schematically illustrating an OSD imaging area in a conventional technology. FIG. 2 is a diagram schematically illustrating another OSD imaging area in a conventional technology. Referring to FIG. 1 and FIG. 2, an image frame has an OSD imaging area. The image frame is divided into a plurality of blocks. Some of the blocks are located on the OSD imaging area. The block has OSD data or non-OSD data. The block at the boundary of the OSD imaging area has both of OSD data and non-OSD data. If the number of pixels of the block that have OSD data is larger than or equal to a threshold, the block will be determined as an OSD block in FIG. 1. If the number of pixels of the block that have OSD data is less than the threshold, the block will be determined as a non-OSD block in FIG. 2. The OSD block is represented by a blank block. The non-OSD block is represented by a slash block. As illustrated in FIG. 1, if the blocks at the boundary of the OSD imaging area are determined as OSD blocks, serious halo phenomena will be caused. As illustrated in FIG. 2, if the blocks at the boundary of the OSD imaging area are determined as non-OSD blocks, the broken OSD imaging area will be caused.

Figure 3:
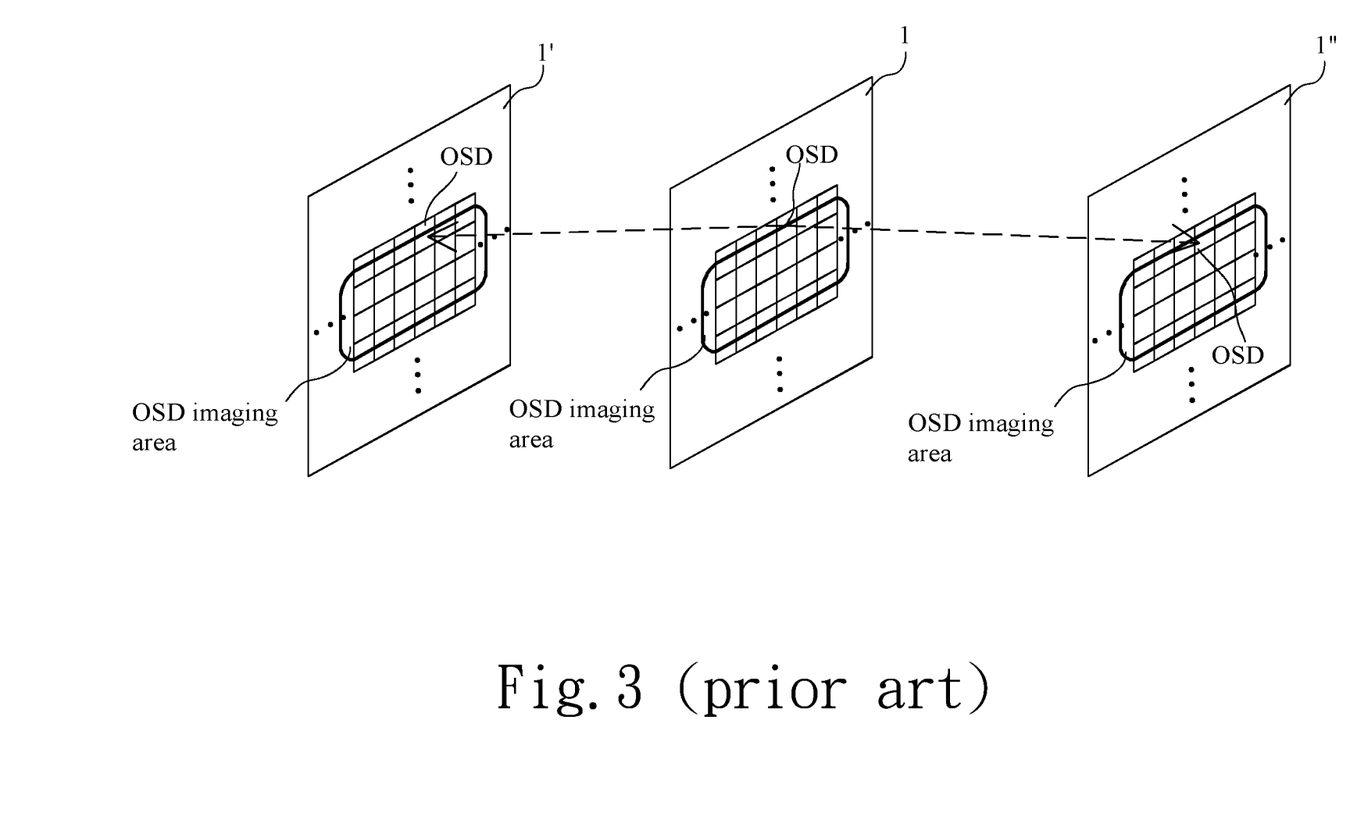
FIG. 3 is a diagram schematically illustrating a previous frame, an interpolated frame, and a current frame in a conventional technology.
Figure 4:
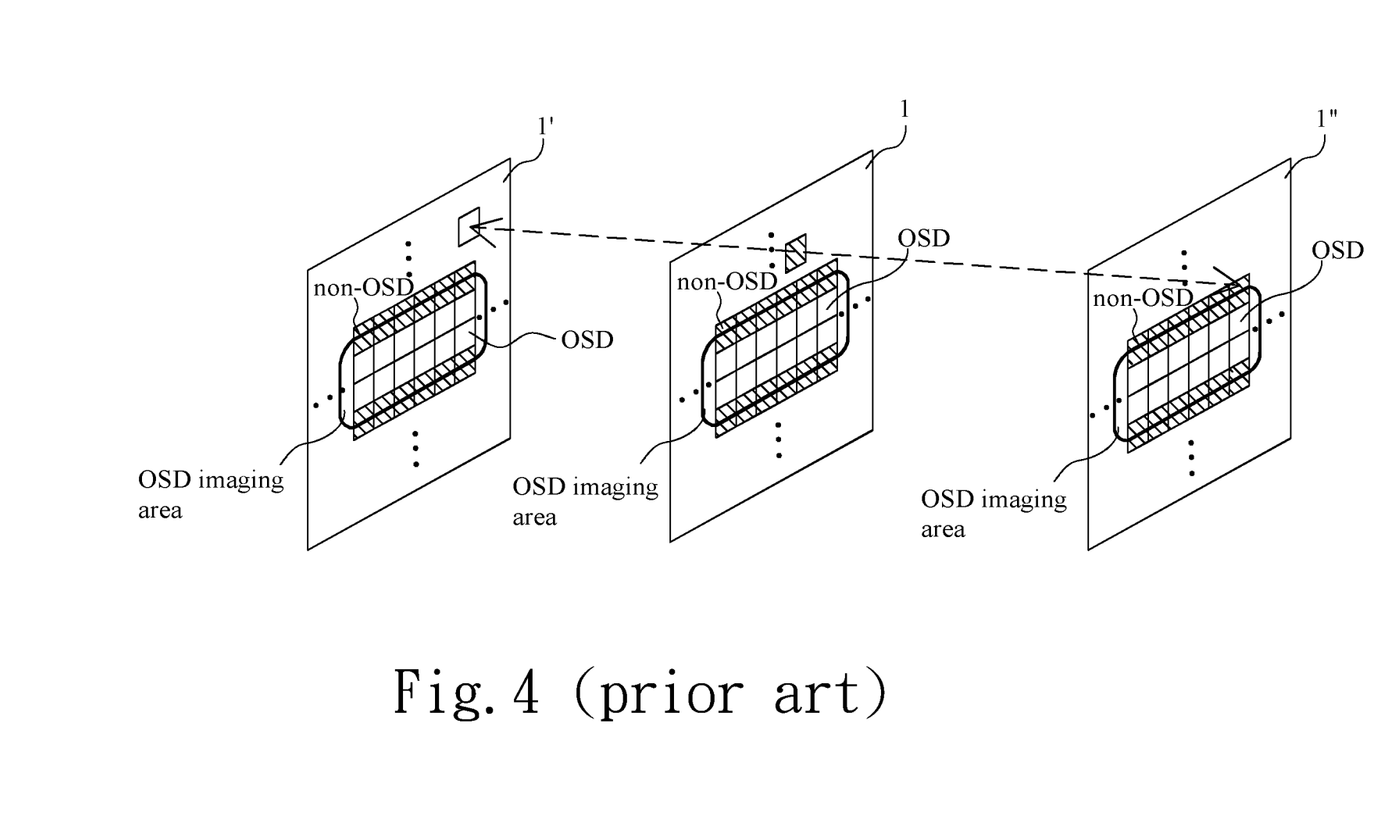
FIG. 4 is a diagram schematically illustrating a previous frame, another interpolated frame, and a current frame in a conventional technology.

FIG. 3 is a diagram schematically illustrating a previous frame, an interpolated frame, and a current frame in a conventional technology. FIG. 4 is a diagram schematically illustrating a previous frame, another interpolated frame, and a current frame in a conventional technology. In FIG. 3 and FIG. 4, an OSD block is represented by a blank block and a non-OSD block is represented by a slash block. Referring to FIG. 3 and FIG. 4, an interpolated frame 1 is interpolated between a previous frame 1' and a current frame 1" in time axis. The interpolated frame 1 shows the OSD imaging area. The interpolated frame 1 has a plurality of blocks, wherein some blocks are located on the OSD imaging area. The block of the interpolated frame 1 is generated by blending the data of the previous frame 1' and the current frame 1" where the block of the interpolated frame 1 uses motion vectors and a zero-motion vector to refer to. The data of the previous frame 1' where the block of the interpolated frame 1 uses the motion vector to refer to have a first weight. The data of the current frame 1" where the block of the interpolated frame 1 uses the motion vector to refer to have a second weight. The data of the previous frame 1' and the current frame 1" where the block of the interpolated frame 1 uses a zero-motion vector to refer to have a third weight. As illustrated in FIG. 3, the block of the interpolated frame 1 at the boundary of the OSD imaging area uses two motion vectors to refer to the block of the previous frame 1' and the block of the current frame 1", wherein the referred blocks of the previous frame 1' and the current frame 1" are determined as OSD blocks. In such a case, if the block of the interpolated frame 1 at the boundary of the OSD imaging area is determined as an OSD block, the third weight will be increased. However, the increased third weight will cause serious halo phenomena. As illustrated in FIG. 4, if the referred block of the current frame 1" including OSD data is determined as a non-OSD block and the block of the interpolated frame 1 is determined as a non-OSD block, the weight corresponding to the referred block of the current frame 1" will be increased. However, the behavior makes the block of the interpolated frame 1 fly out.

SUMMARY OF THE INVENTION

The invention provides an on-screen display (OSD) image processing method, which greatly reduces halo phenomena and the breaks of the boundary of an OSD imaging area and avoids fly-out phenomena.

In an embodiment of the invention, an OSD image processing method generates an interpolated frame from a previous frame and a current frame. The interpolated frame includes a plurality of interpolated blocks. The plurality of interpolated blocks, classified into three types, have OSD blocks, non-OSD blocks and extended OSD blocks. The OSD image processing method includes: performing motion compensation to generate motion compensation (MC) data according to a first motion vector referring to the previous frame and a second motion vector referring to the current frame; generating zero-motion data according to a zero-motion vector referring to the previous frame and the current frame, wherein the value of the zero-motion vector is zero; and blending the MC data of a first weight and the zero-motion data of a second weight to generate each of the plurality of interpolated block as a processed block; wherein when the number of pixels having OSD data in the processed block is less than a first positive threshold and larger than a second positive threshold, the processed block is determined as the extended OSD block, and the second weight of the extended OSD block is less than the second weight of the OSD block.

To sum up, the OSD image processing method newly defines the extended OSD block different from the OSD block and the non-OSD block in order to greatly reduce halo phenomena and the breaks of the boundary of an OSD imaging area and avoid fly-out phenomena.

Below, the embodiments are described in detail in cooperation with the drawings to make easily understood the technical contents, characteristics and accomplishments of the invention.

DETAILED DESCRIPTION OF THE INVENTION

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Unless otherwise specified, some conditional sentences or words, such as "can", "could", "might", or "may", usually attempt to express that the embodiment in the invention has, but it can also be interpreted as a feature, element, or step that may not be needed. In other embodiments, these features, elements, or steps may not be required.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled to," "couples to," and "coupling to" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the article "a" and "the" includes the meaning of "one or at least one" of the element or component. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. Every example in the present specification cannot limit the claimed scope of the invention.

In the following description, an on-screen display (OSD) image processing method will be provided. The OSD image processing method newly defines an extended OSD block different from an OSD block and a non-OSD block in order to greatly reduce halo phenomena and the breaks of the boundary of an OSD imaging area and avoid fly-out phenomena.

Figure 5:
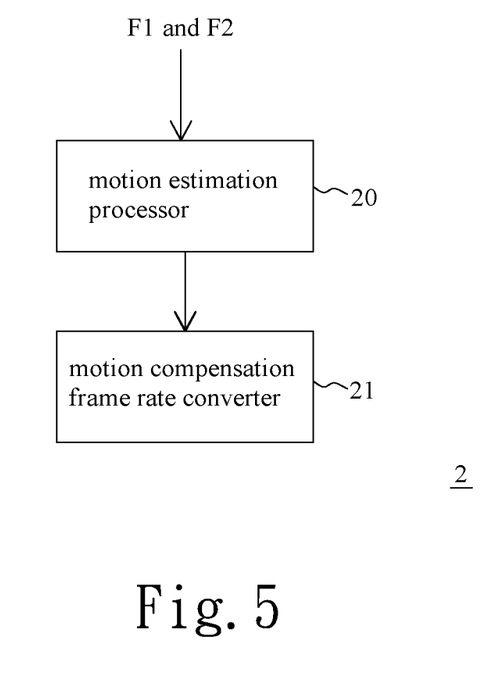
FIG. 5 is a diagram schematically illustrating a motion estimation and motion compensation (MEMC) device according to an embodiment of the invention.
Figure 6:
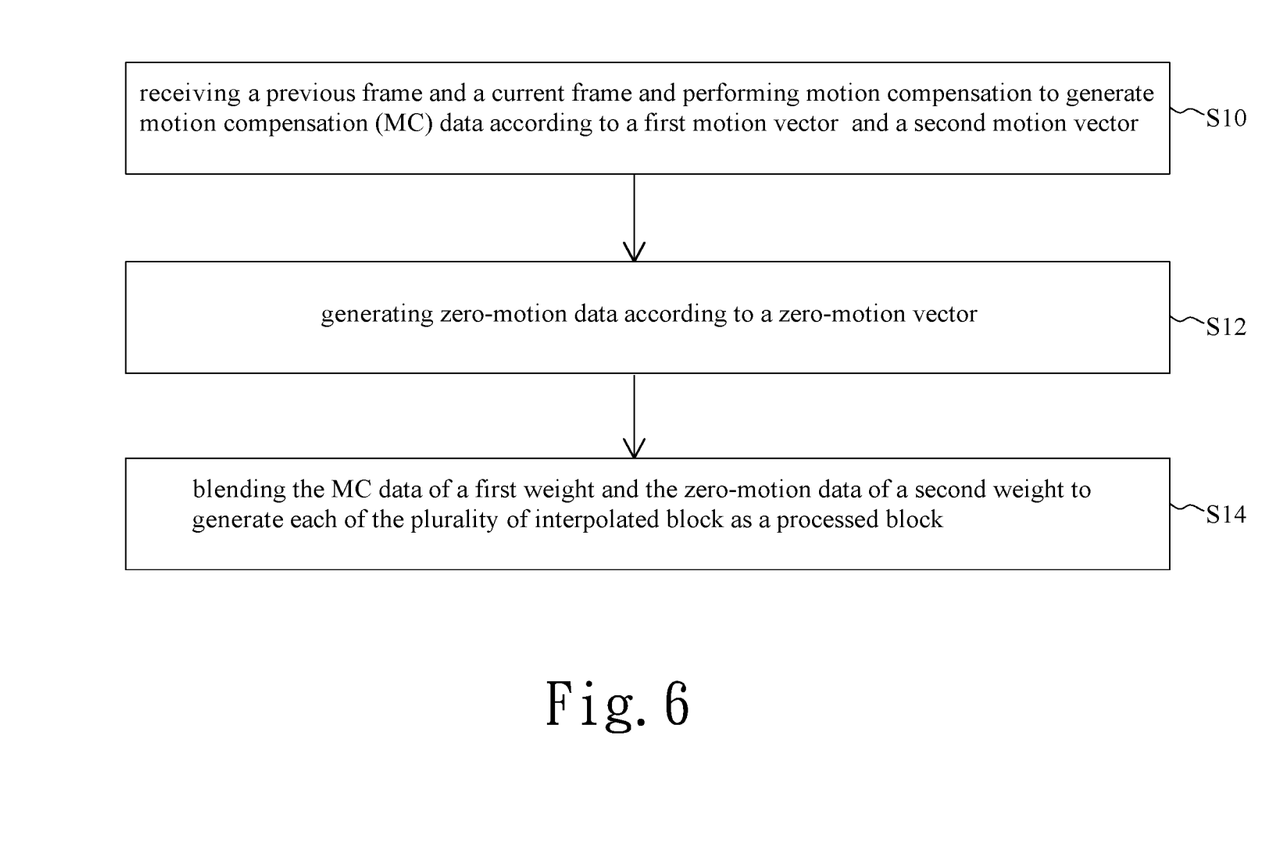
FIG. 6 is a flowchart of an OSD image processing method according to an embodiment of the invention.
Figure 7:
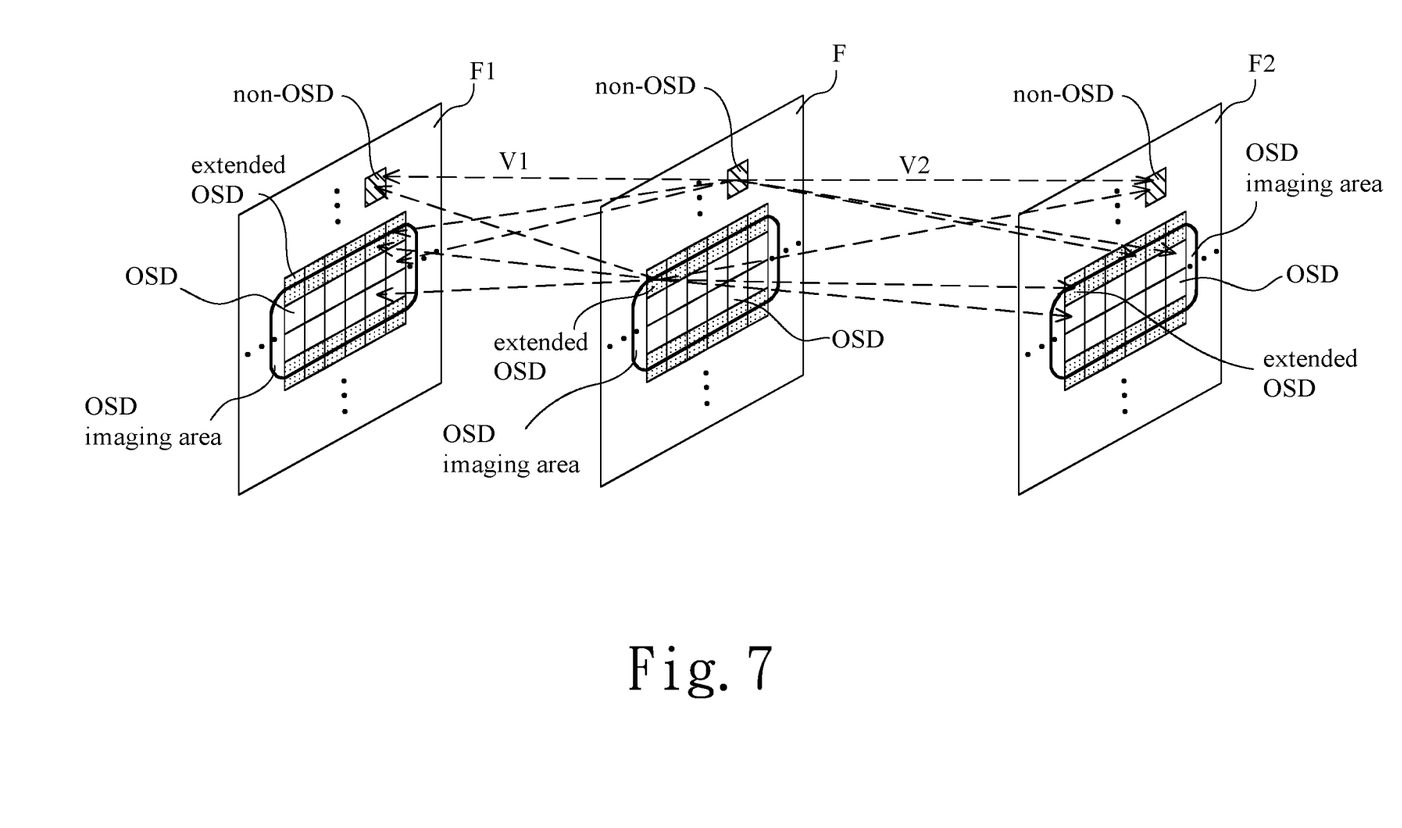
FIG. 7 is a diagram schematically illustrating a previous frame, an interpolated frame, and a current frame according to an embodiment of the invention.

FIG. 5 is a diagram schematically illustrating a motion estimation and motion compensation (MEMC) device 2 according to an embodiment of the invention. FIG. 6 is a flowchart of an OSD image processing method according to an embodiment of the invention. FIG. 7 is a diagram schematically illustrating a previous frame F1, an interpolated frame F, and a current frame F2 according to an embodiment of the invention. Referring to FIG. 5, the MEMC device 2 includes a motion estimation processor 20 and a motion compensation frame rate converter 21. The motion estimation processor 20 is coupled to the motion compensation frame rate converter 21. The architecture in FIG. 5 may be applied to the following embodiments, but the invention is not limited to such the MEMC device 2 in FIG. 5.

Referring to FIG. 5, FIG. 6, and FIG. 7, the OSD image processing method may be performed by, but not limited to, the MEMC device 2 or a processor. The following embodiment exemplifies the MEMC device 2 to perform the OSD image processing method. The OSD image processing method generates an interpolated frame F from a previous frame F1 and a current frame F2. The interpolated frame F includes a plurality of interpolated blocks having OSD blocks, non-OSD blocks and extended OSD blocks. Since OSD blocks are static, the types of OSD blocks (i.e., OSD blocks, non-OSD blocks, and extended OSD blocks) on the corresponding positions of the previous frame F1, the current frame F2, and the interpolated frame F are identical. In other words, it is known that the OSD data of the previous frame F1 and the current frame F2 are identical before the interpolated frame F is generated in most static situations.

In Step S10, the MEMC device 2 sequentially receives a previous image frame F1 and a current image frame F2 in time axis and performs motion compensation to generate motion compensation (MC) data MC according to a first motion vector V1 referring to the previous frame F1 and a second motion vector V2 referring to the current frame F2. In Step S12, the MEMC device 2 generates zero-motion data Z according to a zero-motion vector referring to the previous frame F1 and the current frame F2, wherein the value of the zero-motion vector is zero. That is to say, the positions of the interpolated frame F, the previous image frame F1 and the current image frame F2 corresponding to the zero-motion vector are identical. In Step S14, the MEMC device 2 blends the MC data MC of a first weight W1 and the zero-motion data Z of a second weight W2 to generate each of the plurality of interpolated block as a processed block, thereby interpolating the interpolated frame F between the previous frame F1 and the current frame F2. Provided that substantially the same result is achieved, the steps of the OSD image processing method need not be in the exact order shown and need not be contiguous, that is, other steps can be intermediate. The processed block has OSD data or non-OSD data. The OSD data are static data, such as logos, titles, subtitles, or non-video data, but the invention is not limited thereto. The non-OSD data are non-static data, such as video data. The interpolated frame F has an OSD imaging area. Some of the processed blocks are located on the OSD imaging area.

In an embodiment, the MC data MC and the zero-motion data Z may be blended based on mathematical relation (1) or mathematical relations (1) and (2). In mathematical relation (1), the operation result of MC×W1+Z×W2 is defined as the interpolated image data of the processed block.

$$MC \times W1 + Z \times W2 \quad (1)$$

$$MC = D1 \times W3 + D2 \times W4 + Z \times W5 \quad (2)$$

In mathematical relation (1), the sum of the first weight W1 and the second weight W2 may be, but not limited to, 100% as a constant positive value. FIG. 7 is a diagram schematically illustrating a previous frame F1, an interpolated frame F, and a current frame F2 according to an embodiment of the invention. The MEMC device 2 determines the processed block as the OSD block when the number of pixels having OSD data in the processed block is larger than or equal to a first positive threshold. When the number of pixels having the OSD data in the processed block is less than the first positive threshold and larger than a second positive threshold, the MEMC device 2 determines the processed block as the extended OSD block and adjusts the second weight W2 of the extended OSD block to be less than the second weight W2 of the OSD block. The second positive threshold is less than the first positive threshold. The second weight W2 may be larger than zero when the processed block is determined as the extended OSD block or the OSD block. Since the blocks at the boundary of the OSD imaging area are determined as the extended OSD blocks, the halo phenomena of the boundary of the OSD imaging area can be reduced and the OSD imaging area can be protected. In addition, the MEMC device 2 determines the processed block as the non-OSD block and adjusts the second weight W2 of the processed block to be zero when the number of the pixels that have the OSD data in the processed block is less than or equal to the second positive threshold.

In mathematical relations (1) and (2), the sum of the third weight W3, the fourth weight W4, and the fifth weight W5 may be, but not limited to, 100% as a constant positive value. In another embodiment, the MC data MC may be obtained by blending the first data D1 of the previous frame F1 where the processed block uses the first motion vector V1 to refer to, the second data D2 of the current frame F2 where the processed block uses the second motion vector V2 to refer to, and the zero-motion data Z. Wherein, the first data D1, the second data D2, and the corresponding zero-motion data Z respectively have a third weight W3, a fourth weight W4, and a fifth weight W5.

Specifically, the previous frame F1 has a first block and the processed block uses the first motion vector V1 to refer to the first block as a first reference block. The MEMC device 2 determines the first reference block as the OSD block when the number of pixels having OSD data in the first reference block is larger than or equal to the first positive threshold. The MEMC device 2 determines the first reference block as the extended OSD block when the number of pixels having the OSD data in the first reference block is less than the first positive threshold and larger than the second positive threshold. The MEMC device 2 determines the first reference block as the non-OSD block when the number of pixels having the OSD data in the first reference block is less than or equal to the second positive threshold. The current frame F2 has a second block and the processed block uses the second motion vector V2 to refer to the second block as a second reference block. The MEMC device 2 determines the second reference block as the OSD block when the number of pixels having OSD data in the second reference block is larger than or equal to the first positive threshold. The MEMC device 2 determines the second reference block as the extended OSD block when the number of pixels having the OSD data in the second reference block is less than the first positive threshold and larger than the second positive threshold. The MEMC device 2 determines the second reference block as the non-OSD block when the number of pixels having the OSD data in the second reference block is less than or equal to the second positive threshold.

The MEMC device 2 increases the third weight W3 of the processed block when the MEMC device 2 determines the first reference block and the processed block as the extended OSD blocks. Similarly, the MEMC device 2 increases the fourth weight W4 of the processed block when the MEMC device 2 determines the second reference block and the processed block as the extended OSD blocks. As a result, the halo phenomena of the boundary of the OSD imaging area that is determined as the extended block can be reduced.

The MEMC device 2 decreases the third weight W3 of the processed block when the MEMC device 2 determines the first reference block as the extended OSD block and determines the processed block as the non-OSD block. Similarly, the MEMC device 2 decreases the fourth weight W4 of the processed block when the MEMC device 2 determines the second reference block as the extended OSD block and determines the processed block as the non-OSD block. Therefore, the fly-out phenomena of the interpolated frame F can be avoided.

According to the embodiments provided above, the OSD image processing method defines an extended OSD block different from an OSD block and a non-OSD block in order to greatly reduce halo phenomena and the breaks of the boundary of an OSD imaging area and avoid fly-out phenomena.

The embodiments described above are only to exemplify the invention but not to limit the scope of the invention. Therefore, any equivalent modification or variation according to the shapes, structures, features, or spirit disclosed by the invention is to be also included within the scope of the invention.

What is claimed is:

1. An on-screen display (OSD) image processing method for generating an interpolated frame from a previous frame and a current frame, the interpolated frame comprising a plurality of interpolated blocks having OSD blocks, non-OSD blocks and extended OSD blocks, and the OSD image processing method comprising:
performing motion compensation to generate motion compensation (MC) data according to a first motion vector referring to the previous frame and a second motion vector referring to the current frame;
generating zero-motion data according to a zero-motion vector referring to the previous frame and the current frame, wherein a value of the zero-motion vector is zero; and
blending the MC data of a first weight and the zero-motion data of a second weight to generate each of the plurality of interpolated block as a processed block;
wherein when number of pixels having OSD data in the processed block is less than a first positive threshold and larger than a second positive threshold, the processed block is determined as the extended OSD block, and the second weight of the extended OSD block is less than the second weight of the OSD block.

2. The OSD image processing method according to claim 1, wherein a sum of the first weight and the second weight is a constant positive value.

3. The OSD image processing method according to claim 1, wherein the processed block is determined as the OSD block when the number of the pixels that have the OSD data is larger than or equal to the first positive threshold.

4. The OSD image processing method according to claim 1, wherein the processed block is determined as the non-OSD block and the second weight of the processed block is zero when the number of the pixels that have the OSD data is less than or equal to the second positive threshold.

5. The OSD image processing method according to claim 1, wherein the MC data is obtained by blending first data of the previous frame where the processed block uses the first motion vector to refer to, second data of the current frame where the processed block uses the second motion vector to refer to, and the zero-motion data, and the first data, the second data, and the corresponding zero-motion data respectively have a third weight, a fourth weight, and a fifth weight.

6. The OSD image processing method according to claim 5, wherein a sum of the third weight, the fourth weight, and the fifth weight is a constant positive value.

7. The OSD image processing method according to claim 5, wherein the previous frame has a first block, the processed block uses the first motion vector to refer to the first block as a first reference block, and the third weight of the processed block is decreased when the first reference block is determined as the extended OSD block and the processed block is determined as the non-OSD block.

8. The OSD image processing method according to claim 5, wherein the current frame has a second block, the processed block uses the second motion vector to refer to the second block as a second reference block, and the fourth weight of the processed block is decreased when the second reference block is determined as the extended OSD block and the processed block is determined as the non-OSD block.

9. The OSD image processing method according to claim 5, wherein the previous frame has a first block, the processed block uses the first motion vector to refer to the first block as a first reference block, and the third weight of the processed block is increased when the first reference block and the processed block are determined as the to extended OSD blocks.

10. The OSD image processing method according to claim 5, wherein the current frame has a second block, the processed block uses the second motion vector to refer to the second block as a second reference block, and the fourth weight of the processed block is increased when the second reference block and the processed block are determined as the extended OSD blocks.

11. The OSD image processing method according to claim 1, wherein the second weight of the extended OSD block is larger than zero when the processed block is determined as the extended OSD block.

* * * * *